United States Patent
He et al.

(10) Patent No.: US 9,952,308 B2
(45) Date of Patent: Apr. 24, 2018

(54) ACCESS POINT, TERMINAL, AND WIRELESS FIDELITY WIFI INDOOR POSITIONING METHOD

(71) Applicant: Huawei Technologies Co., Ltd., Shenzhen (CN)

(72) Inventors: Hongkun He, Xi'an (CN); Qianni Feng, Xi'an (CN); Lei Shi, Xi'an (CN); Jie Cui, Shenzhen (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/410,881

(22) Filed: Jan. 20, 2017

(65) Prior Publication Data
US 2017/0131382 A1 May 11, 2017

Related U.S. Application Data

(63) Continuation of application No. PCT/CN2014/082725, filed on Jul. 22, 2014.

(51) Int. Cl.
*H04W 24/00* (2009.01)
*G01S 5/06* (2006.01)
(Continued)

(52) U.S. Cl.
CPC .............. *G01S 5/06* (2013.01); *G01S 5/0081* (2013.01); *G01S 5/021* (2013.01); *H04W 4/04* (2013.01);
(Continued)

(58) Field of Classification Search
CPC ... H04W 4/021; H04W 4/04; H04W 52/0206; H04W 64/00
See application file for complete search history.

(56) References Cited

U.S. PATENT DOCUMENTS

2004/0027251 A1* 2/2004 Sharony ................ G06K 17/00
340/8.1
2010/0135178 A1* 6/2010 Aggarwal ............. G01S 5/0205
370/252
(Continued)

FOREIGN PATENT DOCUMENTS

CN 1480873 A 3/2004
CN 101860952 A 10/2010
(Continued)

OTHER PUBLICATIONS

Machine Translation and Abstract of Chinese Publication No. CN101860952, Oct. 13, 2010, 4 pages.
(Continued)

*Primary Examiner* — Khalid Shaheed
(74) *Attorney, Agent, or Firm* — Conley Rose, P.C.

(57) ABSTRACT

An access point, a terminal, and a Wireless Fidelity indoor positioning method are provided. The method includes: receiving, by a first access point, a first positioning signal sent by a terminal, and recording a moment for receiving the first positioning signal as a first moment $t_1$; receiving, a second positioning signal sent by an $i^{th}$ second access point in n second access points, and recording a fourth moment $t_{i4}$; sending, a response signal of the second positioning signal to the $i^{th}$ second access point, and recording a fifth moment $t_{i5}$; receiving, a second moment $t_{i2}$, a third moment $t_{i3}$, and a sixth moment $t_{i6}$ that are sent by the $i^{th}$ second access point; and determining, location coordinates of the terminal. In the embodiments of the present disclosure, clock synchronization is not required. In addition, terminal positioning accuracy is improved.

10 Claims, 7 Drawing Sheets

(51) Int. Cl.
*G01S 5/00* (2006.01)
*G01S 5/02* (2010.01)
*H04W 4/04* (2009.01)
*H04W 64/00* (2009.01)
*H04W 52/02* (2009.01)

(52) U.S. Cl.
CPC ........ *H04W 52/0206* (2013.01); *H04W 64/00* (2013.01)

(56) References Cited

U.S. PATENT DOCUMENTS

| | | | |
|---|---|---|---|
| 2010/0167758 | A1 | 7/2010 | Mukai et al. |
| 2010/0238917 | A1 | 9/2010 | Silverman et al. |
| 2011/0273991 | A1 | 11/2011 | Dahl et al. |
| 2013/0021206 | A1 | 1/2013 | Hach et al. |
| 2013/0137452 | A1 | 5/2013 | Bevan et al. |
| 2013/0148514 | A1* | 6/2013 | Zhang ............... G01S 5/021 370/252 |
| 2014/0315582 | A1* | 10/2014 | Dong ............... H04W 64/00 455/456.2 |

FOREIGN PATENT DOCUMENTS

| | | |
|---|---|---|
| CN | 103068042 A | 4/2013 |
| CN | 103379427 A | 10/2013 |
| EP | 1396730 A1 | 3/2004 |
| JP | H08211141 A | 8/1996 |
| JP | 2004101254 A | 4/2004 |
| JP | 2006343232 A | 12/2006 |
| JP | 2013513786 A | 4/2013 |
| JP | 2015525503 A | 9/2015 |
| WO | 2013119878 A1 | 8/2013 |
| WO | 2013176999 A1 | 11/2013 |

OTHER PUBLICATIONS

Machine Translation and Abstract of Chinese Publication No. CN103068042, Apr. 24, 2013, 13 pages.
"Part 11: Wireless LAN Medium Access Control (MAC) and Physical Layer (PHY) Specifications," IEEE Std 802.11, Mar. 29, 2012, 2793 pages.
Ciurana, M., et al., "A ranging method with IEEE 802.11 data frames for indoor localization," IEEE Wireless Communications and Networking Conference, Mar. 11-15, 2007, pp. 2094-2098.
Ciurana, M., et al., "A ranging system with IEEE 802.11 data frames," IEEE Radio and Wireless Symposium, Jan. 9-11, 2007, pp. 133-136.
Llombart, M., et al., "On the scalability of a novel WLAN positioning system based on time of arrival measurements," Proceedings of the 5th Workshop on Positioning, Navigation and Communication, Mar. 27, 2008, pp. 15-21.
Golden, S., et al., "Sensor Measurements for Wi-Fi Location with Emphasis on Time-of-Arrival Ranging," IEEE Transactions on Mobile Computing, vol. 6, No. 10, Oct. 2007, pp. 1185-1198.
Foreign Communication From A Counterpart Application, European Application No. 14898111.1, European Partial Supplementary European Search Report dated Jun. 13, 2017, 16 pages.
Foreign Communication From A Counterpart Application, Chinese Application No. 201480001481.6, Chinese Office Action dated Mar. 16, 2017, 14 pages.
Foreign Communication From A Counterpart Application, PCT Application No. PCT/CN2014/082725, English Translation of International Search Report dated Apr. 24, 2015, 2 pages.
Foreign Communication From A Counterpart Application, PCT Application No. PCT/CN2014/082725, English Translation of Written Opinion dated Apr. 24, 2015, 29 pages.
Machine Translation and Abstract of Japanese Publication No. JP2004101254, Apr. 2, 2004, 25 pages.
Machine Translation and Abstract of Japanese Publication No. JP2006343232, Dec. 21, 2006, 32 pages.
Machine Translation and Abstract of Japanese Publication No. JPH08211141, Aug. 20, 1996, 13 pages.
Foreign Communication From A Counterpart Application, Japanese Application No. 2017-503877, Japanese Office Action dated Oct. 24, 2017, 3 pages.
Foreign Communication From A Counterpart Application, Japanese Application No. 2017-503877, English Translation of Japanese Office Action dated Oct. 24, 2017, 4 pages.

* cited by examiner

ACCESS POINT, TERMINAL, AND WIRELESS FIDELITY WIFI INDOOR POSITIONING METHOD

CROSS-REFERENCE TO RELATED APPLICATIONS

This application is a continuation of international patent application number PCT/CN2014/082725 filed on Jul. 22, 2014, which is incorporated by reference.

TECHNICAL FIELD

Embodiments of the present disclosure relate to the field of communications technologies, and in particular, to an access point, a terminal, and a Wireless Fidelity WiFi indoor positioning method.

BACKGROUND

With maturity of The Institute of Electrical and Electronics Engineers (IEEE) 802.11 wireless technologies and popularization of Wi-Fi, or Wifi, around the world, a coverage range of WiFi becomes increasingly wide, and WiFi becomes a standard configuration on a communications device such as a smartphone or a tablet computer. Furthermore, WiFi is supported in many areas such as an enterprise, an airport, a school, a warehouse, and a hospital. Accordingly, a WiFi-based indoor positioning technology emerges.

In some approaches, a terminal location is determined by measuring a difference between round trip times of transmitting a signal between a terminal and at least two access points. For example, two access points (APs) communicate with the terminal. The terminal sends a signal and records a time for sending the signal. After receiving the signal, the two access points directly returns signals. The terminal separately records times for receiving the signals returned by the two access points, calculates a distance between the terminal and each of the two access points according to the time for sending the signal and the times for receiving the signals, and then separately draws circles by taking the two access points as circle centers and taking distances between the access points and the terminal as radiuses. An intersection point of the two circles is an estimation location of the terminal. However, in this solution, processing delays of the access points after the signal sent by the terminal is received cannot be estimated. Therefore, terminal positioning accuracy is affected.

SUMMARY

Embodiments of the present disclosure provide an access point, a terminal, and a Wireless Fidelity WiFi indoor positioning method, so that a first access point and each second access point record an arrival moment of a first positioning signal and an arrival moment and a departure moment of a second positioning signal, thereby implementing a high-accuracy WiFi indoor positioning method.

According to a first aspect, an embodiment of the present disclosure provides an access point, including: a receiver configured to: receive a first positioning signal sent by a terminal, and record a moment for receiving the first positioning signal as a first moment $t_1$; and receive a second positioning signal sent by an $i^{th}$ second access point in n second access points, and record a fourth moment $t_{i4}$, where the second positioning signal is sent by the $i^{th}$ second access point to the first access point according to the first positioning signal received by the $i^{th}$ second access point, $t_{i4}$ indicates a moment at which the first access point receives the second positioning signal sent by the $i^{th}$ second access point, n is an integer greater than or equal to 2, and i is an integer greater than or equal to 1 and less than or equal to n; a transmitter configured to: send a response signal of the second positioning signal to the $i^{th}$ second access point, and record a fifth moment $t_{i5}$, where $t_{i5}$ indicates a moment at which the first access point sends the response signal to the $i^{th}$ second access point; where the receiver is further configured to receive a second moment $t_{i2}$, a third moment $t_{i3}$, and a sixth moment $t_{i6}$ that are sent by the $i^{th}$ second access point, where $t_{i2}$ indicates a moment at which the $i^{th}$ second access point receives the first positioning signal, $t_{i3}$ indicates a moment at which the $i^{th}$ second access point sends the second positioning signal to the first access point, and $t_{i6}$ indicates a moment at which the $i^{th}$ second access point receives the response signal; and a processor configured to determine location coordinates of the terminal according to $t_1$, $t_{i2}$, $t_{i3}$, $t_{i4}$, $t_{i5}$, and $t_{i6}$.

In a first possible implementation manner of the first aspect, the processor is specifically configured to: determine a time difference $t_{id}$ according to $t_1$, $t_{i2}$, $t_{i3}$, $t_{i4}$, $t_{i5}$, and $t_{i6}$, where $t_{id}$ indicates a difference value between a signal transmission time from the terminal to the first access point and a signal transmission time from the terminal to the $i^{th}$ second access point; determine a distance difference $D_{i0}$ according to $t_{id}$, where $D_{i0}=C\times t_{id}$, $D_{i0}$ indicates a difference value between a distance from the terminal to the first access point and a distance from the terminal to the $i^{th}$ second access point, and C indicates a light velocity; and determine the location coordinates of the terminal according to $D_{i0}$, location coordinates of the first access point, and location coordinates of the $i^{th}$ second access point.

With reference to the first possible implementation manner of the first aspect, in a second possible implementation manner, the processor is specifically configured to: determine the signal transmission time $\Delta_1$ from the terminal to the first access point and the signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \; \Delta_{i2} = (t_{i4} - t_0) - (t_{i3} - t_{i2}) - \Delta_{i3}, \; \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and determine $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2};$$

and correspondingly, the processor is specifically configured to determine the location coordinates (x,y) of the terminal according to the following equation $\sqrt{(x_i-x)^2-(y_i-y)^2} - \sqrt{(x_0-x)^2-(y_0-y)^2} = D_{i0}$ determined according to $D_{i0}$, the location coordinates $(x_0,y_0)$ of the first access point, and the location coordinates $(x_i,y_i)$ of the $i^{th}$ second access point.

According to a second aspect, an embodiment of the present disclosure provides a terminal, including: a transmitter configured to send a first positioning signal to a first access point and n second access points, where n is an integer greater than or equal to 2; a receiver configured to receive $t_1$, a fourth moment $t_{i4}$, and a fifth moment $t_{i5}$ that are sent by the first access point and $t_{i2}$, $t_{i3}$, and a sixth moment $t_{i6}$ that are sent by the $i^{th}$ second access point, where $t_1$ indicates a moment at which the first access point receives the first positioning signal, $t_{i2}$ indicates a moment at which the $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n; and a processor configured to determine location coordinates of the terminal according to $t_1$, $t_{i2}$, $t_{i3}$, $t_{i4}$, $t_{i5}$, and $t_{i6}$.

In a first possible implementation manner of the second aspect, the processor is specifically configured to: determine a time difference $t_{id}$ according to $t_1$, $t_{i2}$, $t_{i3}$, $t_{i4}$, $t_{i5}$, and $t_{i6}$, where $t_{id}$ indicates a difference value between a time from the terminal to the first access point and a time from the terminal to the $i^{th}$ second access point; determine a distance difference $D_{i0}$ according to $t_{id}$, where $D_{i0}=C \times t_{id}$, $D_{i0}$ indicates a difference value between a distance from the terminal to the first access point and a distance from the terminal to the $i^{th}$ second access point, and C indicates a light velocity; and determine the location coordinates of the terminal according to $D_{i0}$, location coordinates of the first access point, and location coordinates of the $i^{th}$ second access point.

With reference to the first possible implementation manner of the second aspect, in a second possible implementation manner, the processor is specifically configured to: determine a signal transmission time $\Delta_1$ from the terminal to the first access point and a signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and determine $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2};$$

and correspondingly, the processor is specifically configured to determine the location coordinates (x,y) of the terminal according to the following equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

With reference to any one of the second aspect, or the first to the second possible implementation manners of the second aspect, in a third possible implementation manner, the processor is further configured to: before the terminal sends the first positioning signal to the first access point and the n second access points, send an exploration signal to the access points; determine an access point sending an earliest-received response of the exploration signal as the first access point; and determine access points as the n second access points, where times required for receiving responses of the exploration signal from the access points are in a preset range.

According to a third aspect, an embodiment of the present disclosure provides a terminal, including: a transmitter configured to send a first positioning signal to a first access point and n second access points, where n is an integer greater than or equal to 2; and a receiver configured to receive location coordinates of the terminal determined by the first access point according to $t_1$, $t_{i2}$, $t_{i3}$, $t_{i4}$, $t_{i5}$, and $t_{i6}$, where $t_1$ indicates a moment at which the first access point receives the first positioning signal, $t_{i2}$ indicates a moment at which an $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n.

In a first possible implementation manner of the third aspect, the location coordinates of the terminal is determined by the first access point according to a distance difference $D_{i0}$, location coordinates of the first access point, and location coordinates of the $i^{th}$ second access point by determining a time difference $t_{id}$ according to $t_1$, $t_{i2}$, $t_{i3}$, $t_{i4}$, $t_{i5}$, and $t_{i6}$ and determining $D_{i0}$ according to $t_{id}$, $t_{id}$ indicates a difference value between a signal transmission time from the terminal to the first access point and a signal transmission time from the terminal to the $i^{th}$ second access point, $D_{i0}=C \times t_{id}$, $D_{i0}$ indicates a difference value between a distance from the terminal to the first access point and a distance from the terminal to the $i^{th}$ second access point, and C indicates a light velocity.

With reference to the first possible implementation manner of the third aspect, in a second possible implementation manner, $t_{id}$ is determined by the first access point according to the signal transmission time $\Delta_1$ from the terminal to the first access point and the signal transmission time $\Delta_{i2}$ from the terminal to the $i^{th}$ second access point by determining $\Delta_1$ and $\Delta_{i2}$ according to $t_1$, $t_{i2}$, $t_{i3}$, $t_{i4}$, $t_{i5}$, and $t_{i6}$, $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point, and $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2};$$

and correspondingly, the location coordinates (x,y) of the terminal is determined by the first access point according to an equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

With reference to any one of the third aspect, or the first to the second possible implementation manners of the third aspect, in a third possible implementation manner, the terminal further includes: a processor configured to: before the terminal sends the first positioning signal to the first access point and the n second access points, send an exploration signal to the access points; determine an access point sending an earliest-received response of the exploration signal as the first access point; and determine access points as the n second access points, where times required for receiving responses of the exploration signal from the access points are in a preset range.

According to a fourth aspect, an embodiment of the present disclosure provides a Wireless Fidelity WiFi indoor positioning method, including: receiving, by a first access point, a first positioning signal sent by a terminal, and recording a moment for receiving the first positioning signal as a first moment $t_1$; receiving, by the first access point, a second positioning signal sent by an $i^{th}$ second access point in n second access points, and recording a fourth moment $t_{i4}$, where the second positioning signal is sent by the $i^{th}$ second access point to the first access point according to the first positioning signal received by the $i^{th}$ second access point, $t_{i4}$ indicates a moment at which the first access point receives the second positioning signal sent by the $i^{th}$ second access point, n is an integer greater than or equal to 2, and i is an integer greater than or equal to 1 and less than or equal to n; sending, by the first access point, a response signal of the second positioning signal to the $i^{th}$ second access point, and recording a fifth moment $t_{i5}$, where $t_{i5}$ indicates a moment at which the first access point sends the response signal to the $i^{th}$ second access point; receiving, by the first access point, a second moment $t_{i2}$, a third moment $t_{i3}$, and a sixth moment $t_{i6}$ that are sent by the $i^{th}$ second access point, where $t_{i2}$ indicates a moment at which the $i^{th}$ second access point receives the first positioning signal, $t_{i3}$ indicates a moment at which the $i^{th}$ second access point sends the second positioning signal to the first access point, and $t_{i6}$ indicates a moment at which the $i^{th}$ second access point receives the response signal; and determining, by the first access point, location coordinates of the terminal according to $t_1$, $t_{i2}$, $t_{i3}$, $t_{i4}$, $t_{i5}$, and $t_{i6}$.

In a first possible implementation manner of the fourth aspect, the determining, by the first access point, location coordinates of the terminal according to $t_1$, $t_{i2}$, $t_{i3}$, $t_{i4}$, $t_{i5}$, and $t_{i6}$ includes: determining, by the first access point, a time difference $t_{id}$ according to $t_1$, $t_{i2}$, $t_{i3}$, $t_{i4}$, $t_{i5}$, and $t_{i6}$, where $t_{id}$ indicates a difference value between a signal transmission time from the terminal to the first access point and a signal transmission time from the terminal to the $i^{th}$ second access point; determining, by the first access point, a distance difference $D_{i0}$ according to $t_{id}$, where $D_{i0}=C \times t_{id}$, $D_{i0}$ indicates a difference value between a distance from the terminal to the first access point and a distance from the terminal to the $i^{th}$ second access point, and C indicates a light velocity; and determining, by the first access point, the location coordinates of the terminal according to $D_{i0}$, location coordinates of the first access point, and location coordinates of the $i^{th}$ second access point.

With reference to the first possible implementation manner of the fourth aspect, in a second possible implementation manner, the determining, by the first access point, a time difference $t_{id}$ according to $t_1$, $t_{i2}$, $t_{i3}$, $t_{i4}$, $t_{i5}$, and $t_{i6}$ includes: determining, by the first access point, the signal transmission time $\Delta_1$ from the terminal to the first access point and the signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \; \Delta_{i2} = (t_{i4} - t_0) - (t_{i3} - t_{i2}) - \Delta_{i3}, \; \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and determining, by the first access point, $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2};$$

and correspondingly, the determining, by the first access point, the location coordinates of the terminal according to $D_{i0}$, location coordinates of the first access point, and location coordinates of the $i^{th}$ second access point includes: determining, by the first access point, the location coordinates $(x,y)$ of the terminal according to the following equation $\sqrt{(x_i-x)^2-(y_i-y)^2} - \sqrt{(x_0-x)^2-(y_0-y)^2} = D_{i0}$ determined according to $D_{i0}$, the location coordinates $(x_0,y_0)$ of the first access point, and the location coordinates $(x_i,y_i)$ of the $i^{th}$ second access point.

According to a fifth aspect, an embodiment of the present disclosure provides a Wireless Fidelity WiFi indoor positioning method, including: sending, by a terminal, a first positioning signal to a first access point and n second access points, where n is an integer greater than or equal to 2; receiving, by the terminal, $t_1$, a fourth moment $t_{i4}$, and a fifth moment $t_{i5}$ that are sent by the first access point and $t_{i2}$, $t_{i3}$, and a sixth moment $t_{i6}$ that are sent by the $i^{th}$ second access point, where $t_1$ indicates a moment at which the first access point receives the first positioning signal, $t_{i2}$ indicates a moment at which the $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n; and determining, by the terminal, location coordinates of the terminal according to $t_1$, $t_{i2}$, $t_{i3}$, $t_{i4}$, $t_{i5}$, and $t_{i6}$.

In a first possible implementation manner of the fifth aspect, the determining, by the terminal, location coordinates of the terminal according to $t_1$, $t_{i2}$, $t_{i3}$, $t_{i4}$, $t_{i5}$, and $t_{i6}$ includes: determining, by the terminal, a time difference $t_{id}$ according to $t_1$, $t_{i2}$, $t_{i3}$, $t_{i4}$, $t_{i5}$, and $t_{i6}$, where $t_{id}$ indicates a difference value between a signal transmission time from the terminal to the first access point and a signal transmission time from the terminal to the $i^{th}$ second access point; determining, by the terminal, a distance difference $D_{i0}$ according to $t_{id}$, where $D_{i0}=C \times t_{id}$, $D_{i0}$ indicates a difference value between a distance from the terminal to the first access point and a distance from the terminal to the $i^{th}$ second access point, and C indicates a light velocity; and determining, by the terminal, the location coordinates of the terminal according to $D_{i0}$, location coordinates of the first access point, and location coordinates of the $i^{th}$ second access point.

With reference to the first possible implementation manner of the fifth aspect, in a second possible implementation manner, the determining, by the terminal, a time difference $t_{id}$ according to $t_1$, $t_{i2}$, $t_{i3}$, $t_{i4}$, $t_{i5}$, and $t_{i6}$ includes: determining, by the terminal, the signal transmission time $\Delta_1$ from the terminal to the first access point and the signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and determining, by the terminal, $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2};$$

and correspondingly, the determining, by the terminal, the location coordinates of the terminal according to $D_{i0}$, location coordinates of the first access point, and location coordinates of the $i^{th}$ second access point includes: determining, by the terminal, the location coordinates (x,y) of the terminal according to the following equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

With reference to any one of the fifth aspect, or the first to the second possible implementation manners of the fifth aspect, in a third possible implementation manner, before the sending, by a terminal, a first positioning signal to a first access point and n second access points, the method further includes: sending, by the terminal, an exploration signal to the access points; determining, by the terminal, an access point sending an earliest-received response of the exploration signal as the first access point; and determining, by the terminal, access points as the n second access points, where times required for receiving responses of the exploration signal from the access points are in a preset range.

According to a sixth aspect, an embodiment of the present disclosure provides a Wireless Fidelity WiFi indoor positioning method, including: sending, by a terminal, a first positioning signal to a first access point and n second access points, where n is an integer greater than or equal to 2; and receiving, by the terminal, location coordinates of the terminal determined by the first access point according to $t_1$, $t_{i2}$, $t_{i3}$, $t_{i4}$, $t_{i5}$, and $t_{i6}$, where $t_1$ indicates a moment at which the first access point receives the first positioning signal, $t_{i2}$ indicates a moment at which an $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n.

In a first possible implementation manner of the sixth aspect, the location coordinates of the terminal is determined by the first access point according to a distance difference $D_{i0}$, location coordinates of the first access point, and location coordinates of the $i^{th}$ second access point by determining a time difference $t_{id}$ according to $t_1$, $t_{i2}$, $t_{i3}$, $t_{i4}$, $t_{i5}$, and $t_{i6}$ and determining $D_{i0}$ according to $t_{id}$, $t_{id}$ indicates a difference value between a signal transmission time from the terminal to the first access point and a signal transmission time from the terminal to the $i^{th}$ second access point, $D_{i0}=C\times t_{id}$, $D_{i0}$ indicates a difference value between a distance from the terminal to the first access point and a distance from the terminal to the $i^{th}$ second access point, and C indicates a light velocity.

With reference to the first possible implementation manner of the sixth aspect, in a second possible implementation manner, $t_{id}$ is determined by the first access point according to the signal transmission time $\Delta_1$ from the terminal to the first access point and the signal transmission time $\Delta_{i2}$ from the terminal to the $i^{th}$ second access point by determining $\Delta_1$ and $\Delta_{i2}$ according to $t_1$, $t_{i2}$, $t_{i3}$, $t_{i4}$, $t_{i5}$, and $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point, and $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2};$$

and correspondingly, the location coordinates (x,y) of the terminal is determined by the first access point according to an equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

With reference to any one of the sixth aspect, or the first to the second possible implementation manners of the sixth aspect, in a third possible implementation manner, before the sending, by a terminal, a first positioning signal to a first access point and n second access points, the method further includes: sending, by the terminal, an exploration signal to the access points; determining, by the terminal, an access point sending an earliest-received response of the exploration signal as the first access point; and determining, by the terminal, access points as the n second access points, where times required for receiving responses of the exploration signal from the access points are in a preset range.

According to an access point, a terminal, and a Wireless Fidelity WiFi indoor positioning method in the embodiments of the present disclosure, a first access point receives a first positioning signal sent by a terminal, and records a moment for receiving the first positioning signal as a first moment $t_1$; the first access point receives a second positioning signal sent by an $i^{th}$ second access point in n second access points, and records a fourth moment $t_{i4}$; the first access point sends a response signal to the $i^{th}$ second access point, and records a fifth moment $t_{i5}$; the first access point receives a second moment $t_{i2}$, a third moment $t_{i3}$, and a sixth moment $t_{i6}$ that are sent by the $i^{th}$ second access point; and the first access point determines location coordinates of the terminal according to $t_1$, $t_{i2}$, $t_{i3}$, $t_{i4}$, $t_{i5}$, and $t_{i6}$. In the embodiments of the present disclosure, clock synchronization is not required. In addition, a delay of processing a received signal by an access point can be obtained accurately, and terminal positioning accuracy is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1A:
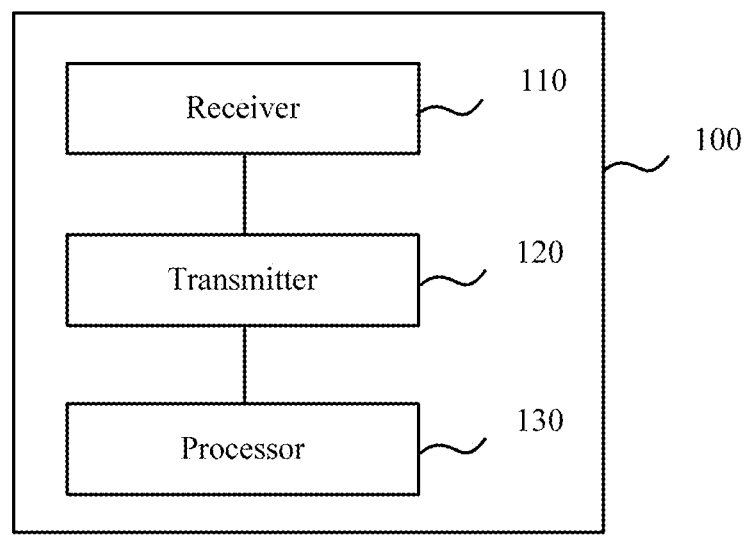
FIG. 1A is a schematic structural diagram of an access point 100 according to an embodiment of the present disclosure.

FIG. 1A is a schematic structural diagram of an access point 100 according to an embodiment of the present disclosure. In this embodiment, an access point is used as an execution body to determine location coordinates of a terminal. The access point 100 in this embodiment is applied to a case in which high-accuracy positioning of a terminal location is implemented in an indoor environment with a WiFi hotspot, and the access point is generally implemented in a hardware and/or software manner. The access point 100 in this embodiment may be a first access point. In this embodiment, the access point includes a receiver 110, a transmitter 120, and a processor 130.

The receiver 110 is configured to: receive a first positioning signal sent by a terminal, and record a moment for receiving the first positioning signal as a first moment $t_1$; and receive a second positioning signal sent by an $i^{th}$ second access point in n second access points, and record a fourth moment $t_{i4}$, where the second positioning signal is sent by the $i^{th}$ second access point to the first access point according to the first positioning signal received by the $i^{th}$ second access point, $t_{i4}$ indicates a moment at which the first access point receives the second positioning signal sent by the $i^{th}$ second access point, n is an integer greater than or equal to 2, and i is an integer greater than or equal to 1 and less than or equal to n. The transmitter 120 is configured to: send a response signal of the second positioning signal to the $i^{th}$ second access point, and record a fifth moment $t_{i5}$, where $t_{i5}$ indicates a moment at which the first access point sends the response signal to the $i^{th}$ second access point. The receiver 110 is further configured to receive a second moment $t_{i2}$, a third moment $t_{i3}$, and a sixth moment $t_{i6}$ that are sent by the $i^{th}$ second access point, where $t_{i2}$ indicates a moment at which the $i^{th}$ second access point receives the first positioning signal, $t_{i3}$ indicates a moment at which the $i^{th}$ second access point sends the second positioning signal to the first access point, and $t_{i6}$ indicates a moment at which the $i^{th}$ second access point receives the response signal. The processor 130 is configured to determine location coordinates of the terminal according to $t_1$, $t_{i2}$, $t_{i3}$, $t_{i4}$, $t_{i5}$, and $t_{i6}$.

It should be noted that, after the terminal sends the first positioning signal, access points (the first access point and the second access point) in a transmission range of the terminal receive the first positioning signal. In this embodiment, the first access point records the moment for receiving the first positioning signal as $t_1$, and the moment at which the $i^{th}$ second access point receives the first positioning signal is $t_{i2}$. After receiving the first positioning signal, the $i^{th}$ second access point immediately sends the second positioning signal to the first access point. The first access point receives the second positioning signal sent by the $i^{th}$ second access point and records the moment for receiving the second positioning signal sent by the $i^{th}$ second access point as $t_{i4}$. The first access point sends the response signal of the second positioning signal to the $i^{th}$ second access point and records the moment for sending the response signal of the second positioning signal to the $i^{th}$ second access point as $t_{i5}$. The $i^{th}$ second access point receives the response signal that is of the second positioning signal and is sent by the first access point at $t_{i5}$, and records, as $t_{i6}$, the moment for receiving the response signal that is of the second positioning signal and is sent by the first access point at $t_{i5}$. In the foregoing signal round-trip processes, moments recorded by the first access point are $t_1$, $t_{i4}$, and $t_{i5}$, and moments recorded by the $i^{th}$ second access point are $t_{i2}$, $t_{i3}$, and $t_{i6}$. Then, the $i^{th}$ second access point sends the recorded moments $t_{i2}$, $t_{i3}$, and $t_{i6}$ to the first access point. The first access point may determine the location coordinates of the terminal according to $t_1$, $t_{i2}$, $t_{i3}$, $t_{i4}$, $t_{i5}$, and $t_{i6}$. To ensure accurate measurement of time, all the foregoing moments are moments measured when a packet header of a signal frame arrives at or departs a transceiver antenna port.

Figure 1B:
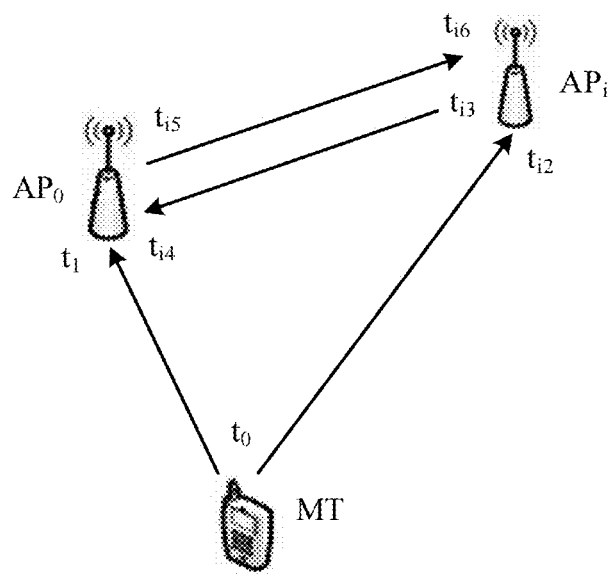
FIG. 1B is a schematic diagram of positioning location coordinates of a terminal in an indoor environment according to an embodiment of the present disclosure.

To describe the foregoing processes in detail, an example is used for description with reference to FIG. 1B herein. FIG. 1B is a schematic diagram of positioning location coordinates of a terminal in an indoor environment according to an embodiment of the present disclosure. As shown in FIG. 1B, an MT is used as the terminal, an $AP_0$ is used as the first access point, and an $AP_i$ is used as the $i^{th}$ second access point. The MT sends a first positioning signal at a moment $t_0$. A moment at which the $AP_0$ receives the first positioning signal is recorded as $t_1$, and a moment at which the $AP_i$ receives the first positioning signal is recorded as $t_{i2}$. After receiving, at $t_{i2}$, the first positioning signal sent by the MT at the moment $t_0$, the $AP_i$ immediately starts signal round-trip transmission with the $AP_0$. The $AP_i$ sends a second positioning signal to the $AP_0$ at a moment $t_{i3}$ and records the moment. The $AP_0$ receives, at a moment $t_{i4}$, the second positioning signal sent by the $AP_i$, and sends a response signal of the second positioning signal to the $AP_i$ at a moment $t_{i5}$. The $AP_i$ receives the response signal that is of the second positioning signal and is sent by the $AP_0$ at $t_{i5}$, and records, as $t_{i6}$, a moment for receiving the response signal that is of the second positioning signal and is sent by the $AP_0$ at $t_{i5}$. The $AP_0$ receives $t_{i2}$, $t_{i3}$, and $t_{i6}$ sent by the $AP_i$, and determines a location of the MT according to $t_{i2}$, $t_{i3}$, and $t_{i6}$ that are received and $t_1$, $t_{i4}$, and $t_{i5}$ that are recorded by the $AP_0$.

The access point provided in this embodiment records an arrival moment of a first positioning signal, records an arrival moment of a second positioning signal and a moment for sending a response signal of the second positioning signal to a second access point, receives moment information sent by the second access point, and determines location coordinates of a terminal according to moment information recorded by the access point and received moment information sent by the second access point. Clock synchronization is not required for determining the location coordinates of the terminal, and the second access point records an arrival moment and a departure moment of a signal. In addition, a delay of processing a received signal by an access point can be obtained accurately, and terminal positioning accuracy is improved.

Further, on a basis of the foregoing embodiment, the processor 130 is specifically configured to: determine a time difference $t_d$ according to $t_1$, $t_{i2}$, $t_{i3}$, $t_{i4}$, $t_{i5}$, and $t_{i6}$, where $t_{id}$ indicates a difference value between a signal transmission time from the terminal to the first access point and a signal transmission time from the terminal to the $i^{th}$ second access point; determine a distance difference $D_{i0}$ according to $t_d$, where $D_{i0}=C\times t_{id}$, $D_{i0}$ indicates a difference value between a distance from the terminal to the first access point and a distance from the terminal to the $i^{th}$ second access point, and C indicates a light velocity; and determine the location coordinates of the terminal according to $D_{i0}$, location coordinates of the first access point, and location coordinates of the $i^{th}$ second access point. It should be noted herein that, in this embodiment, that the second access point sends time information to the first access point is used as a basis, and the first access point determines the location coordinates of the terminal. If the second access point and the first access point separately send, to the terminal, moment information recorded by the second access point and the first access point, the terminal may determine the location coordinates of the terminal. If the second access point and the first access point separately send moment information recorded by the second access point and the first access point to a positioning server, the positioning server may determine the location coordinates of the terminal.

Further, on a basis of the foregoing embodiment, the processor 130 is specifically configured to: determine the signal transmission time $\Delta_1$ from the terminal to the first access point and the signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and determine $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2}.$$

In the four brackets in the formula for calculating the time difference, two moments for subtraction in each bracket are two moments of a same clock, that is, $t_{i4}-t_1$ is a difference value between two moments recorded by a clock of the $AP_0$, and $t_{i5}-t_{i4}$ is also a difference value between two moments recorded by the clock of the $AP_0$; and $t_{i3}-t_{i2}$ is a difference value between two moments recorded by a clock of the $AP_i$, and $t_{i6}-t_{i3}$ is also a difference value between two moments recorded by the clock of the $AP_i$. Therefore, a deviation between a clock of an access point and a standard clock is eliminated, and terminal positioning accuracy is improved.

It should be noted that, in the four brackets in the formula for calculating $t_{id}$, two moments for subtraction in each bracket are two moments of a same clock, and a clock of the first access point is used as an example herein to describe that a difference value between $t_{i4}$ and $t_1$ can offset a deviation between the clock of the first access point and the standard clock. $t_{i4}$ includes the deviation between the clock of the first access point and the standard clock, and $t_1$ also includes the deviation between the clock of the first access point and the standard clock. Therefore, the difference value between $t_{i4}$ and $t_1$ can offset the deviation between the clock of the first access point and the standard clock, and clock synchronization is not required. In addition, an error of the difference value calculated between $t_{i4}$ and $t_1$ is only related to a crystal oscillator frequency error $\varepsilon$ of the clock of the first access point. $\varepsilon$ is a clock drift error per unit of time and has a very minor impact on a time difference. $\varepsilon$ is $10^{-5}$ approximately and may be negligible. Therefore, accuracy of a time difference between two moments of a same clock is improved greatly. A specific analysis is as follows:

It is assumed that the clock of the first access point starts timing from $t_0$ and $t_s$ is a moment recorded by the standard clock, and a moment recorded by the clock of the first access point is:

$$t=t_s+u+\varepsilon(t-t_0), \quad (1)$$

where u is the deviation between the clock of the first access point and the standard clock, $\varepsilon$ is a crystal oscillator frequency error coefficient of the clock of the first access point, and $\varepsilon(t-t_0)$ is an accumulated crystal oscillator frequency error of the clock of the first access point during timing starting from the moment $t_0$ to the moment t. The formula (1) is merged and simplified to obtain:

$$t = \frac{t_s + u - \varepsilon t_0}{1-\varepsilon} = (t_s + u - \varepsilon t_0)(1+\varepsilon). \quad (2)$$

For a same clock, deviations between the clock and the standard clock at different moments and an error caused by a crystal oscillator frequency of the clock generally remain unchanged. Therefore, an expression of another moment $t_1$ of the clock is:

$$t_1=(t_{s1}+u-\varepsilon t_0)(1+\varsigma). \quad (3)$$

The following formula can be obtained by subtracting $t_1$ from t:

$$t-t_1=(t_s+u-\varepsilon t_0)(1+\varsigma)-(t_{s1}+u-\varepsilon t_0)(1+\varsigma)=(t_s-t_{s1})(1+\varepsilon). \quad (4)$$

As can be seen from the formula (4), a time difference between two moments of a same clock can offset the deviation between the clock of the first access point and the standard clock and some errors caused by a crystal oscillator frequency of the clock of the first access point, and clock synchronization is not required. In addition, the error of the difference value calculated between $t_{i4}$ and $t_1$ is only related to the crystal oscillator frequency error ε of the clock of the first access point. ε has a very minor impact on the time difference, is $10^{-5}$ approximately, and may be negligible. Therefore, accuracy of a time difference between two moments of a same clock is greatly improved. A distance error caused by a transmission time difference 600 ns is only 1.8 mm. Therefore, positioning accuracy is greatly improved.

Correspondingly, the processor 130 is specifically configured to determine the location coordinates (x,y) of the terminal according to the following equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

Three second access points are used as examples herein. The three second access points are respectively a $1^{st}$ second access point, a $2^{nd}$ second access point, and a $3^{rd}$ second access point. Three equations determined according to the foregoing determined equation are as follows:

$$\sqrt{(x_1-x)^2-(y_1-y)^2}-\sqrt{(x_0-x)^2-(y_0-y)^2}=D_{i0} \quad (5)$$

$$\sqrt{(x_2-x)^2-(y_2-y)^2}-\sqrt{(x_0-x)^2-(y_0-y)^2}=D_{i0} \quad (6)$$

$$\sqrt{(x_3-x)^2-(y_3-y)^2}-\sqrt{(x_0-x)^2-(y_0-y)^2}=D_{i0} \quad (7)$$

The location coordinates of the terminal may be determined by solving a non-linear equation set including the foregoing formulas.

The first access point solves an equation set including i established equations to determine the location coordinates of the terminal. A difference between a signal transmission time from the terminal to the second access point and a signal transmission time from the terminal to the first access point is obtained accurately. Therefore, a difference between a distance from the terminal to the second access point and a distance from the terminal to the first access point is also obtained accurately according to the difference between the signal transmission time from the terminal to the second access point and the signal transmission time from the terminal to the first access point, and the location coordinates of the terminal can be located accurately.

Figure 2:
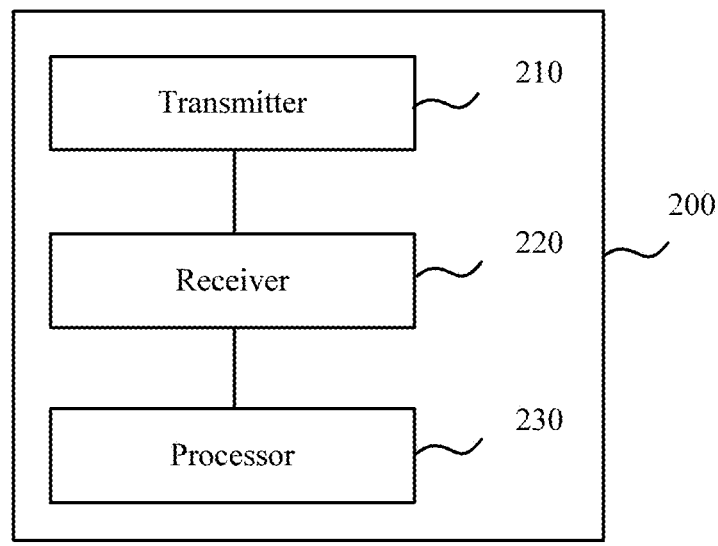
FIG. 2 is a schematic structural diagram of a terminal 200 according to an embodiment of the present disclosure.

FIG. 2 is a schematic structural diagram of a terminal 200 according to an embodiment of the present disclosure. A difference between this embodiment and the foregoing embodiment lies in that, in this embodiment, a terminal is used as an execution body to determine location coordinates of the terminal. The terminal 200 in this embodiment is applied to a case in which high-accuracy positioning of a terminal location is implemented in an indoor environment with a WiFi hotspot, and the terminal is generally implemented in a hardware and/or software manner. The terminal in this embodiment includes a transmitter 210, a receiver 220, and a processor 230.

The transmitter 210 is configured to send a first positioning signal to a first access point and n second access points, where n is an integer greater than or equal to 2. The receiver 220 is configured to receive $t_1$, a fourth moment $t_{i4}$, and a fifth moment $t_{i5}$ that are sent by the first access point and $t_{i2}$, $t_{i3}$, and a sixth moment $t_{i6}$ that are sent by the $i^{th}$ second access point, where $t_1$ indicates a moment at which the first access point receives the first positioning signal, $t_{i2}$ indicates a moment at which the $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n. The processor 230 is configured to determine location coordinates of the terminal according to $t_1$, $t_{i2}$, $t_{i3}$, $t_{i4}$, $t_{i5}$, and $t_{i6}$.

The terminal provided in this embodiment first sends a first positioning signal to a first access point and n second access points, then receives time information sent by the first access point and time information sent by a second access point, and determines location coordinates of the terminal according to the received time information sent by the first access point and the received time information sent by the second access point. Clock synchronization is not required for determining the location coordinates of the terminal, and the second access point and the first access point record an arrival moment and a departure moment of a signal. In addition, a delay of processing a received signal by an access point can be obtained accurately, and terminal positioning accuracy is improved.

Further, on a basis of the foregoing embodiment, the processor 230 is specifically configured to: determine a time difference $t_{id}$ according to $t_1$, $t_{i2}$, $t_{i3}$, $t_{i4}$, $t_{i5}$, and $t_{i6}$, where $t_{id}$ indicates a difference value between a signal transmission time from the terminal to the first access point and a signal transmission time from the terminal to the $i^{th}$ second access point; determine a distance difference $D_{i0}$ according to $t_{id}$, where $D_{i0}=C \times t_{id}$, $D_{i0}$ indicates a difference value between a distance from the terminal to the first access point and a distance from the terminal to the $i^{th}$ second access point, and C indicates a light velocity; and determine the location coordinates of the terminal according to $D_{i0}$, location coordinates of the first access point, and location coordinates of the $i^{th}$ second access point.

Further, on a basis of the foregoing embodiment 2, the processor 230 is specifically configured to: determine the signal transmission time $\Delta_1$ from the terminal to the first access point and the signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and determine $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2}.$$

Correspondingly, the processor 230 is specifically configured to determine the location coordinates (x,y) of the terminal according to the following equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

It should be noted that a principle and an implemented technical effect in a calculation process of determining the location coordinates of the terminal in this embodiment are similar to that in the foregoing embodiment, and details are not described herein again.

Further, on a basis of the foregoing embodiment, the processor 230 is further configured to: before the terminal sends the first positioning signal to the first access point and the n second access points, send an exploration signal to the access points; determine, as the first access point, an access point sending an earliest-received response of the exploration signal; and determine access points as the n second access points, where times required for receiving responses of the exploration signal from the access points are in a preset range.

Figure 3:
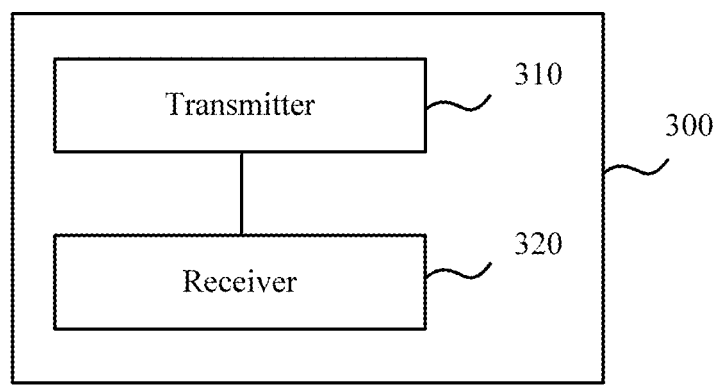
FIG. 3 is a schematic structural diagram of a terminal 300 according to an embodiment of the present disclosure.

FIG. 3 is a schematic structural diagram of a terminal 300 according to an embodiment of the present disclosure. The terminal 300 in this embodiment is applied to a case in which high-accuracy positioning of a terminal location is implemented in an indoor environment with a WiFi hotspot, and the terminal is generally implemented in a hardware and/or software manner. The terminal in this embodiment includes a transmitter 310 and a receiver 320.

The transmitter 310 is configured to send a first positioning signal to a first access point and n second access points, where n is an integer greater than or equal to 2. The receiver 320 is configured to receive location coordinates of the terminal determined by the first access point according to $t_1$, $t_{i2}$, $t_{i3}$, $t_{i4}$, $t_{i5}$, and $t_{i6}$, where $t_1$ indicates a moment at which the first access point receives the first positioning signal, $t_{i2}$ indicates a moment at which an $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n.

The terminal provided in this embodiment first sends a first positioning signal to a first access point and n second access points, and receives location coordinates of the terminal determined by the first access point according to $t_1$, $t_{i2}$, $t_{i3}$, $t_{i4}$, $t_{i5}$, and $t_{i6}$. Clock synchronization is not required for the first access point to determine the location coordinates of the terminal, and a second access point records an arrival moment and a departure moment of a signal. In addition, a delay of processing a received signal by an access point can be obtained accurately, and terminal positioning accuracy is improved.

Further, on a basis of the foregoing embodiment, the location coordinates of the terminal is determined by the first access point according to a distance difference $D_{i0}$, location coordinates of the first access point, and location coordinates of the $i^{th}$ second access point by determining a time difference $t_{id}$ according to $t_1$, $t_{i2}$, $t_{i3}$, $t_{i4}$, $t_{i5}$, and $t_{i6}$ and determining $D_{i0}$ according to $t_{id}$, $t_{id}$ indicates a difference value between a signal transmission time from the terminal to the first access point and a signal transmission time from the terminal to the $i^{th}$ second access point, $D_{i0}=C \times t_{id}$, $D_{i0}$ indicates a difference value between a distance from the terminal to the first access point and a distance from the terminal to the $i^{th}$ second access point, and C indicates a light velocity.

Further, $t_{id}$ is determined by the first access point according to the signal transmission time $\Delta_1$ from the terminal to the first access point and the signal transmission time $\Delta_{i2}$ from the terminal to the $i^{th}$ second access point by determining $\Delta_1$ and $\Delta_{i2}$ according to $t_1$, $t_{i2}$, $t_{i3}$, $t_{i4}$, $t_{i5}$, and $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point, and $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2}.$$

Correspondingly, the location coordinates (x,y) of the terminal is determined by the first access point according to an equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

Further, the terminal 300 further includes a processor configured to: before the terminal sends the first positioning signal to the first access point and the n second access points, send an exploration signal to the access points; determine an access point sending an earliest-received response of the exploration signal as the first access point; and determine access points as the n second access points, where times required for receiving responses of the exploration signal from the access points are in a preset range.

Figure 4:
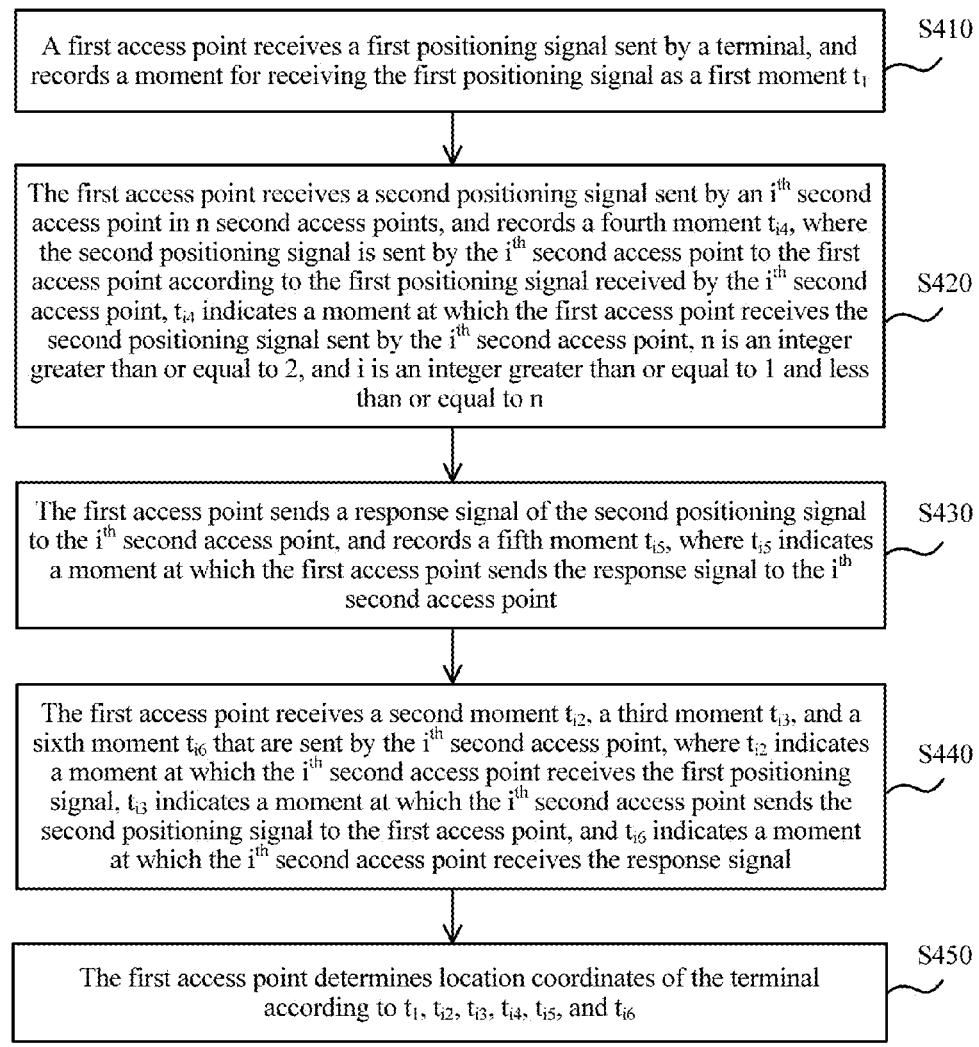
FIG. 4 is a flowchart of a WiFi indoor positioning method according to an embodiment of the present disclosure.

FIG. 4 is a flowchart of a WiFi indoor positioning method according to an embodiment of the present disclosure. The WiFi indoor positioning method in this embodiment is applied to a case in which high-accuracy positioning of a terminal location is implemented in an indoor environment with a WiFi hotspot. The method is executed by a first access point, and the first access point is generally implemented in a hardware and/or software manner. The method in this embodiment includes the following steps:

S410. The first access point receives a first positioning signal sent by a terminal, and records a moment for receiving the first positioning signal as a first moment $t_1$.

S420. The first access point receives a second positioning signal sent by an $i^{th}$ second access point in n second access points, and records a fourth moment $t_{i4}$, where the second positioning signal is sent by the $i^{th}$ second access point to the first access point according to the first positioning signal received by the $i^{th}$ second access point, $t_{i4}$ indicates a moment at which the first access point receives the second positioning signal sent by the $i^{th}$ second access point, n is an integer greater than or equal to 2, and i is an integer greater than or equal to 1 and less than or equal to n.

S430. The first access point sends a response signal of the second positioning signal to the $i^{th}$ second access point, and records a fifth moment $t_{i5}$, where $t_{i5}$ indicates a moment at which the first access point sends the response signal to the $i^{th}$ second access point.

S440. The first access point receives a second moment $t_{i2}$, a third moment $t_{i3}$, and a sixth moment $t_{i6}$ that are sent by the $i^{th}$ second access point, where $t_{i2}$ indicates a moment at which the $i^{th}$ second access point receives the first positioning signal, $t_{i3}$ indicates a moment at which the $i^{th}$ second access point sends the second positioning signal to the first access point, and $t_{i6}$ indicates a moment at which the $i^{th}$ second access point receives the response signal.

S450. The first access point determines location coordinates of the terminal according to $t_1$, $t_{i2}$, $t_{i3}$, $t_{i4}$, $t_{i5}$, and $t_{i6}$.

According to the WiFi indoor positioning method provided in this embodiment, a first access point records an arrival moment of a first positioning signal, records an arrival moment of a second positioning signal and a moment for sending a response signal of the second positioning signal to a second access point, receives moment information sent by the second access point, and determines location coordinates of a terminal according to moment information recorded by the first access point and the received moment information sent by the second access point. Clock synchronization is not required for determining the location coordinates of the terminal, and the second access point and the first access point record an arrival moment and a departure moment of a signal. In addition, a delay of processing a received signal by an access point can be obtained accurately, and terminal positioning accuracy is improved.

Figure 5:
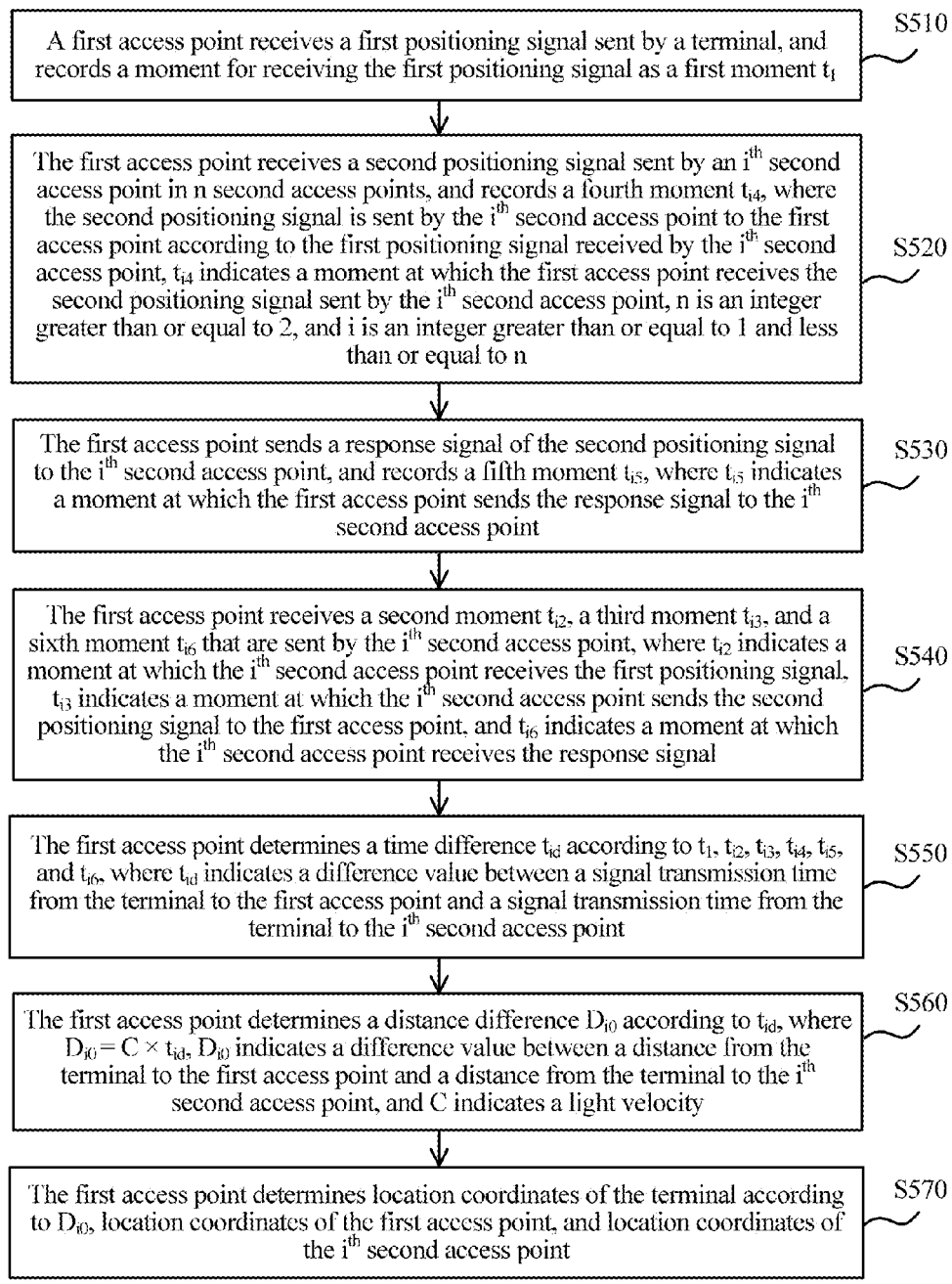
FIG. 5 is a flowchart of a WiFi indoor positioning method according to another embodiment of the present disclosure.

FIG. 5 is a flowchart of a WiFi indoor positioning method according to another embodiment of the present disclosure. This embodiment is further optimized based on the foregoing embodiment. Referring to FIG. 5, the method in this embodiment may include the following steps.

S510. A first access point receives a first positioning signal sent by a terminal, and records a moment for receiving the first positioning signal as a first moment $t_1$.

S520. The first access point receives a second positioning signal sent by an $i^{th}$ second access point in n second access points, and records a fourth moment $t_{i4}$, where the second positioning signal is sent by the $i^{th}$ second access point to the first access point according to the first positioning signal received by the $i^{th}$ second access point, $t_{i4}$ indicates a moment at which the first access point receives the second positioning signal sent by the $i^{th}$ second access point, n is an integer greater than or equal to 2, and i is an integer greater than or equal to 1 and less than or equal to n.

S530. The first access point sends a response signal of the second positioning signal to the $i^{th}$ second access point, and records a fifth moment $t_{i5}$, where $t_{i5}$ indicates a moment at which the first access point sends the response signal to the $i^{th}$ second access point.

S540. The first access point receives a second moment $t_{i2}$, a third moment $t_{i3}$, and a sixth moment $t_{i6}$ that are sent by the $i^{th}$ second access point, where $t_{i2}$ indicates a moment at which the $i^{th}$ second access point receives the first positioning signal, $t_{i3}$ indicates a moment at which the $i^{th}$ second access point sends the second positioning signal to the first access point, and $t_{i6}$ indicates a moment at which the $i^{th}$ second access point receives the response signal.

S550. The first access point determines a time difference $t_{id}$ according to $t_1$, $t_{i2}$, $t_{i3}$, $t_{i4}$, $t_{i5}$, and $t_{i6}$, where $t_{id}$ indicates a difference value between a signal transmission time from the terminal to the first access point and a signal transmission time from the terminal to the $i^{th}$ second access point.

For example, the first access point may determine the time difference $t_{id}$ according to $t_1$, $t_{i2}$, $t_{i3}$, $t_{i4}$, $t_{i5}$, and $t_{i6}$ in the following manner:

The first access point determines the signal transmission time $\Delta_1$ from the terminal to the first access point and the signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and the first access point determines $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2}.$$

It should be noted that, in the four brackets in the formula for calculating $t_{id}$, two moments for subtraction in each bracket are two moments of a same clock, and a clock of the first access point is used as an example herein to describe that a difference value between $t_{i4}$ and $t_1$ can offset a deviation between the clock of the first access point and a standard clock. $t_{i4}$ includes the deviation between the clock of the first access point and the standard clock, and $t_1$ also includes the deviation between the clock of the first access point and the standard clock. Therefore, the difference value between $t_{i4}$ and $t_1$ can offset the deviation between the clock of the first access point and the standard clock, and clock synchronization is not required. In addition, an error of the difference value calculated between $t_{i4}$ and $t_1$ is only related to a crystal oscillator frequency error ε of the clock of the first access point. ε is a clock drift error per unit of time and has a very minor impact on a time difference. ε is $10^{-5}$ approximately and may be negligible. Therefore, accuracy of a time difference between two moments of a same clock is greatly improved. A specific analysis is as follows:

It is assumed that the clock of the first access point starts timing from $t_0$ and $t_s$ is a moment recorded by the standard clock, and a moment recorded by the clock of the first access point is shown in equation (1), where u is the deviation between the clock of the first access point and the standard clock, ε is a crystal oscillator frequency error coefficient of the clock of the first access point, and ε(t−$t_0$) is an accumulated crystal oscillator frequency error of the clock of the first access point during timing starting from the moment $t_0$ to the moment t. The formula (1) is merged and simplified to obtain equation (2).

For a same clock, deviations between the clock and the standard clock at different moments and an error caused by a crystal oscillator frequency of the clock generally remain unchanged. Therefore, an expression of another moment $t_1$ of the clock is shown in equation (3).

Formula (4) can be obtained by subtracting $t_1$ from t.

As can be seen from the formula (4), a time difference between two moments of a same clock can offset the deviation between the clock of the first access point and the standard clock and some errors caused by a crystal oscillator frequency of the clock of the first access point, and clock synchronization is not required. In addition, the error of the difference value calculated between $t_{i4}$ and $t_1$ is only related to the crystal oscillator frequency error ε of the clock of the first access point. ε has a very minor impact on the time difference, is $10^{-5}$ approximately, and may be negligible. Therefore, accuracy of a time difference between two moments of a same clock is greatly improved. A distance error caused by a transmission time difference 600 ns is only 1.8 mm. Therefore, positioning accuracy is greatly improved.

It should be noted that, in this embodiment, that the second access point sends time information to the first access point is used as a basis, and the first access point determines the location coordinates of the terminal. If the second access point and the first access point separately send, to the terminal, moment information recorded by the second access point and the first access point, the terminal may determine the location coordinates of the terminal. If the second access point and the first access point separately send moment information recorded by the second access point and the first access point to a positioning server, the positioning server may determine the location coordinates of the terminal.

S560. The first access point determines a distance difference $D_{iK}$) according to La, where $D_{i0}=C \times t_{id}$, $D_{i0}$ indicates a difference value between a distance from the terminal to the first access point and a distance from the terminal to the $i^{th}$ second access point, and C indicates a light velocity.

S570. The first access point determines location coordinates of the terminal according to $D_{i0}$, location coordinates of the first access point, and location coordinates of the $i^{th}$ second access point.

For example, the first access point may determine the location coordinates of the terminal according to $D_{i0}$, the location coordinates of the first access point, and the location coordinates of the $i^{th}$ second access point in the following manner:

The first access point determines the location coordinates (x,y) of the terminal according to the following equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

Three second access points are used as examples herein. The three second access points are respectively a $1^{st}$ second access point, a $2^{nd}$ second access point, and a $3^{rd}$ second access point. Three equations established according to $\sqrt{(x_i-x)^2-(y_i-y)^2}-\sqrt{(x_0-x)^2-(y_0-y)^2}=D_{i0}$ are equations (5), (6), and (7).

The location coordinates of the terminal may be determined by solving a non-linear equation set including the foregoing formulas (5), (6), and (7).

According to the WiFi indoor positioning method provided in this embodiment, a first access point records an arrival moment of a first positioning signal, records an arrival moment of a second positioning signal and a moment for sending a response signal of the second positioning signal to a second access point, receives moment information sent by the second access point, determines a difference between a signal transmission time from a terminal to the second access point and a signal transmission time from the terminal to the first access point and a difference between a distance from the terminal to the second access point and a distance from the terminal to the first access point according to moment information recorded by the first access point and received moment information sent by the second access point, and determines location coordinates of the terminal according to the distance difference, location coordinates of the first access point, and location coordinates of the second access point. Clock synchronization is not required for determining the location coordinates of the terminal, and the second access point and the first access point record an arrival moment and a departure moment of a signal. In addition, a delay of processing a received signal by an access point can be obtained accurately, and terminal positioning accuracy is improved.

Figure 6:
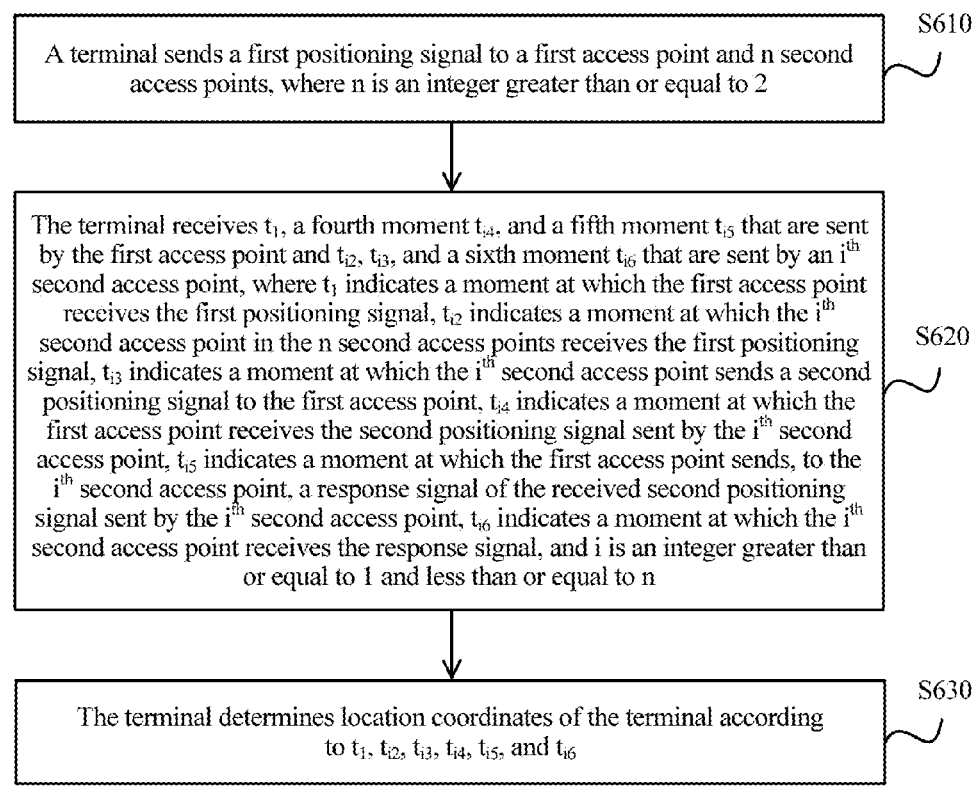
FIG. 6 is a flowchart of a WiFi indoor positioning method according to another embodiment of the present disclosure.

FIG. 6 is a flowchart of a WiFi indoor positioning method according to another embodiment of the present disclosure. The WiFi indoor positioning method in this embodiment is applied to a case in which high-accuracy positioning of a terminal location is implemented in an indoor environment with a WiFi hotspot. The method is executed by a terminal, and the terminal is generally implemented in a hardware and/or software manner. The method in this embodiment includes the following steps:

S610. The terminal sends a first positioning signal to a first access point and n second access points, where n is an integer greater than or equal to 2.

S620. The terminal receives $t_1$, a fourth moment $t_{i4}$, and a fifth moment $t_{i5}$ that are sent by the first access point and $t_{i2}$, $t_{i3}$, and a sixth moment $t_{i6}$ that are sent by an $i^{th}$ second access point, where $t_1$ indicates a moment at which the first access point receives the first positioning signal, $t_{i2}$ indicates a moment at which the $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n.

S630. The terminal determines location coordinates of the terminal according to $t_1$, $t_{i2}$, $t_{i3}$, $t_{i4}$, $t_{i5}$, and $t_{i6}$.

According to the WiFi indoor positioning method provided in this embodiment, a terminal first sends a first positioning signal to a first access point and n second access points, then receives time information sent by the first access point and time information sent by a second access point, and determines location coordinates of the terminal according to the time information sent by the first access point and the time information sent by the second access point. Clock synchronization is not required for determining the location coordinates of the terminal, and the second access point and the first access point record an arrival moment and a departure moment of a signal. In addition, a delay of processing a received signal by an access point can be obtained accurately, and terminal positioning accuracy is improved.

Figure 7:
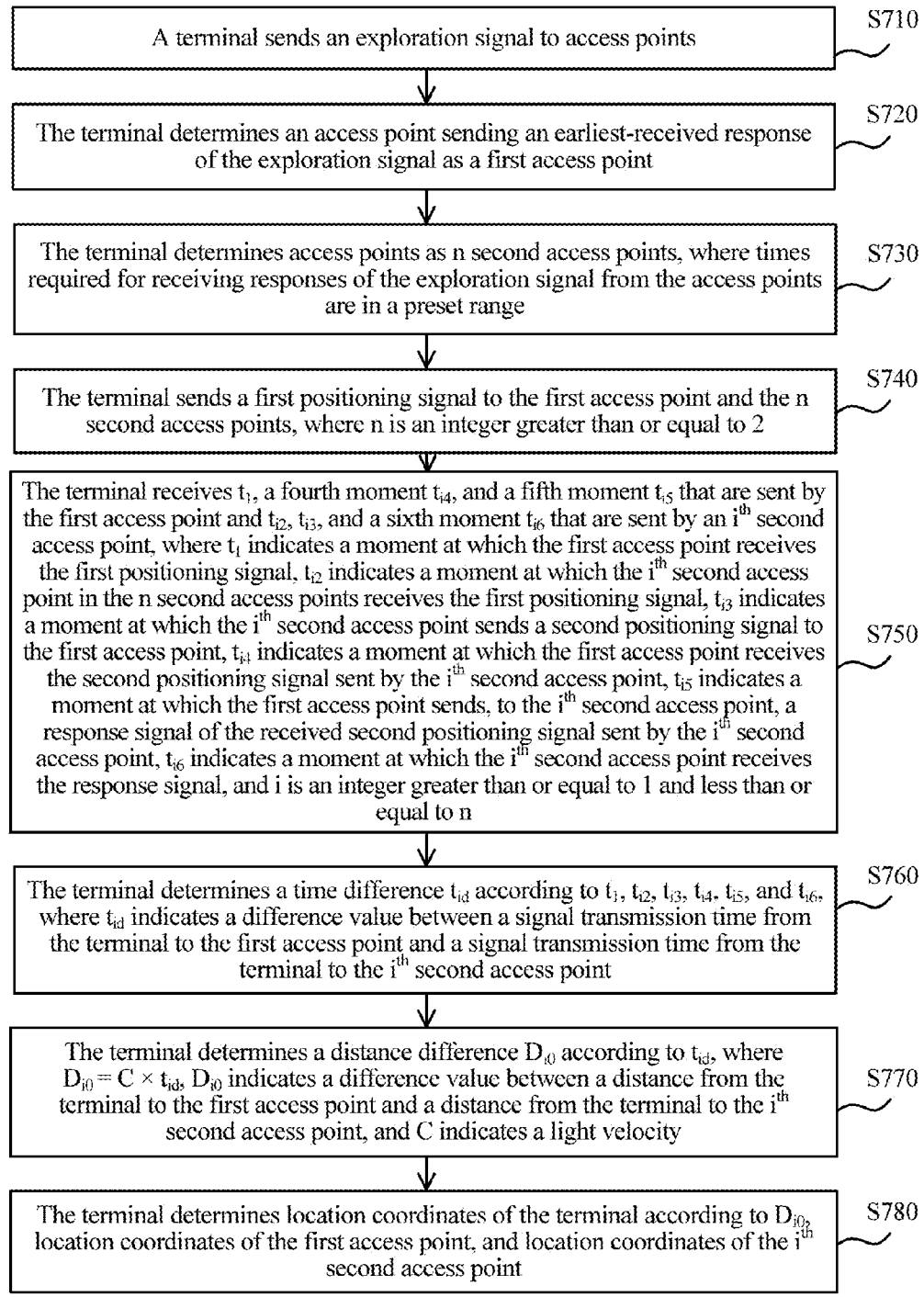
FIG. 7 is a flowchart of a WiFi indoor positioning method according to another embodiment of the present disclosure.

FIG. 7 is a flowchart of a WiFi indoor positioning method according to another embodiment of the present disclosure. This embodiment is further optimized based on the foregoing embodiment. Referring to FIG. 7, the method in this embodiment may include the following steps.

S710. A terminal sends an exploration signal to access points.

S720. The terminal determines an access point sending an earliest-received response of the exploration signal as a first access point.

S730. The terminal determines access points as n second access points, where times required for receiving responses of the exploration signal from the access points are in a preset range.

S740. The terminal sends a first positioning signal to the first access point and the n second access points, where n is an integer greater than or equal to 2.

S750. The terminal receives $t_1$, a fourth moment $t_{i4}$, and a fifth moment $t_{i5}$ sent that are by the first access point and $t_{i2}$, $t_{i3}$, and a sixth moment $t_{i6}$ that are sent by an $i^{th}$ second access point, where $t_1$ indicates a moment at which the first access point receives the first positioning signal, $t_{i2}$ indicates a moment at which the $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n.

S760. The terminal determines a time difference $t_{id}$ according to $t_1$, $t_{i2}$, $t_{i3}$, $t_{i4}$, $t_{i5}$, and $t_{i6}$, where $t_{id}$ indicates a difference value between a signal transmission time from the terminal to the first access point and a signal transmission time from the terminal to the $i^{th}$ second access point.

For example, the terminal may determine the time difference $t_{id}$ according to $t_1$, $t_{i2}$, $t_{i3}$, $t_{i4}$, $t_{i5}$, and $t_{i6}$ in the following manner:

The terminal determines the signal transmission time $\Delta_1$ from the terminal to the first access point and the signal transmission time $\Delta_{i2}$ from the terminal to the $i^{th}$ second access point according to $t_1$, $t_{i2}$, $t_{i3}$, $t_{i4}$, $t_{i5}$, and $t_{i6}$, where $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point; and the terminal determines $t_{id}$ according to $\Delta_1$ and $\Delta_{i2}$, where $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2}.$$

It should be noted that, in this embodiment, the terminal is used as an execution body to determine location coordinates of the terminal. A principle and an implemented technical effect in a calculation process of determining the difference between the signal transmission time from the terminal to the second access point and the signal transmission time from the terminal to the first access point are similar to that in the foregoing embodiment, and therefore, details are not described herein again.

S770. The terminal determines a distance difference $D_{i0}$ according to $t_{id}$, where $D_{i0} = C \times t_{id}$, $D_{i0}$ indicates a difference value between a distance from the terminal to the first access point and a distance from the terminal to the $i^{th}$ second access point, and C indicates a light velocity.

S780. The terminal determines location coordinates of the terminal according to $D_{i0}$, location coordinates of the first access point, and location coordinates of the $i^{th}$ second access point.

For example, the terminal may determine the location coordinates of the terminal according to $D_{i0}$, the location coordinates of the first access point, and the location coordinates of the $i^{th}$ second access point in the following manner:

The terminal determines the location coordinates (x,y) of the terminal according to the following equation $\sqrt{(x_i-x)^2-(y_i-y)^2} - \sqrt{(x_0-x)^2-(y_0-y)^2} = D_{i0}$ determined according to $D_{i0}$, the location coordinates $(x_0,y_0)$ of the first access point, and the location coordinates $(x_i,y_i)$ of the $i^{th}$ second access point.

It should be noted that, in this embodiment, determining the location coordinates of the terminal is similar to the foregoing embodiment, and details are not described herein again.

According to the WiFi indoor positioning method provided in this embodiment, a terminal first sends a first positioning signal to a first access point and n second access points, then receives time information sent by the first access point and time information sent by a second access point, determines a difference between a signal transmission time from the terminal to the second access point and a signal transmission time from the terminal to the first access point and a difference between a distance from the terminal to the second access point and a distance from the terminal to the first access point according to the time information sent by the first access point and the time information sent by the second access point, and determines location coordinates of the terminal according to the distance difference, location coordinates of the first access point, and location coordinates of the second access point. Clock synchronization is not required for determining the location coordinates of the terminal, and the second access point and the first access point record an arrival moment and a departure moment of a signal. In addition, a delay of processing a received signal by an access point can be obtained accurately, and terminal positioning accuracy is improved.

Figure 8:
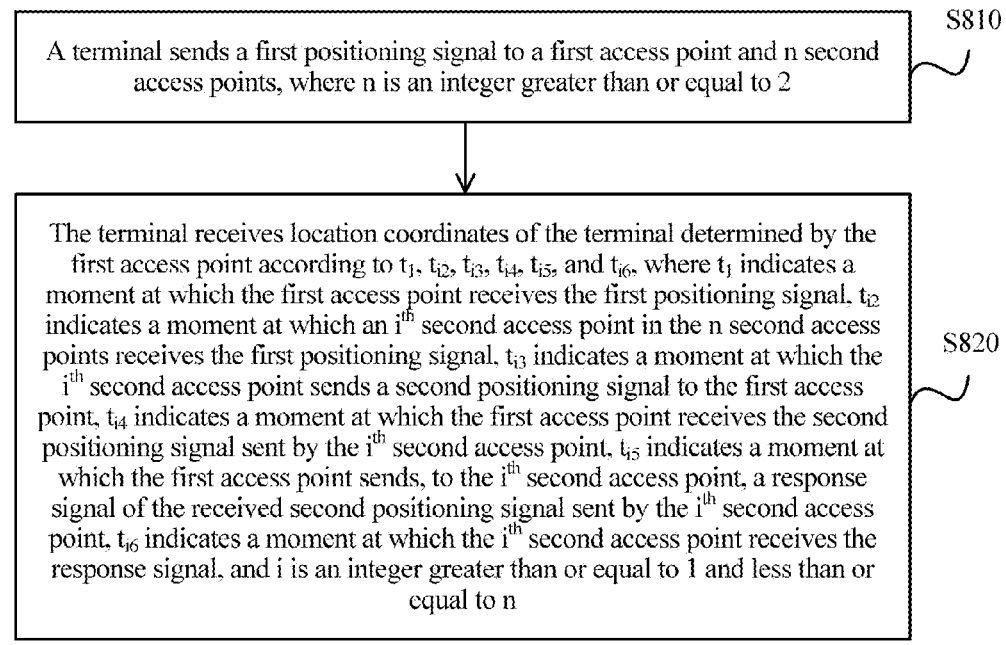
FIG. 8 is a flowchart of a WiFi indoor positioning method according to another embodiment of the present disclosure.

FIG. 8 is a flowchart of a WiFi indoor positioning method according to another embodiment of the present disclosure. The WiFi indoor positioning method in this embodiment is applied to a case in which high-accuracy positioning of a terminal location is implemented in an indoor environment with a WiFi hotspot. The method is executed by a terminal, and the terminal is generally implemented in a hardware and/or software manner. The method in this embodiment includes the following steps:

S810. The terminal sends a first positioning signal to a first access point and n second access points, where n is an integer greater than or equal to 2.

S820. The terminal receives location coordinates of the terminal determined by the first access point according to $t_1$, $t_{i2}$, $t_{i3}$, $t_{i4}$, $t_{i5}$, and $t_{i6}$, where $t_1$ indicates a moment at which the first access point receives the first positioning signal, $t_{i2}$ indicates a moment at which an $i^{th}$ second access point in the n second access points receives the first positioning signal, $t_{i3}$ indicates a moment at which the $i^{th}$ second access point sends a second positioning signal to the first access point, $t_{i4}$ indicates a moment at which the first access point receives the second positioning signal sent by the $i^{th}$ second access point, $t_{i5}$ indicates a moment at which the first access point sends, to the $i^{th}$ second access point, a response signal of the received second positioning signal sent by the $i^{th}$ second access point, $t_{i6}$ indicates a moment at which the $i^{th}$ second access point receives the response signal, and i is an integer greater than or equal to 1 and less than or equal to n.

According to the WiFi indoor positioning method provided in this embodiment, a first positioning signal is first sent to a first access point and n second access points, and location coordinates of the terminal determined by the first access point according to $t_1$, $t_{i2}$, $t_{i3}$, $t_{i4}$, $t_{i5}$, and $t_{i6}$ are received. Clock synchronization is not required for the first access point to determine the location coordinates of the terminal, and a second access point records an arrival moment and a departure moment of a signal. Therefore, a delay of processing a received signal by an access point can be obtained accurately, and terminal positioning accuracy is improved.

Further, the location coordinates of the terminal is determined by the first access point according to a distance difference $D_{i0}$, location coordinates of the first access point, and location coordinates of the $i^{th}$ second access point by determining a time difference $t_{id}$ according to $t_1$, $t_{i2}$, $t_{i3}$, $t_{i4}$, $t_{i5}$, and $t_{i6}$ and determining $D_{i0}$ according to $t_{id}$, $t_{id}$ indicates a difference value between a signal transmission time from the terminal to the first access point and a signal transmission time from the terminal to the $i^{th}$ second access point, $D_{i0}=C \times t_{id}$, $D_{i0}$ indicates a difference value between a distance from the terminal to the first access point and a distance from the terminal to the $i^{th}$ second access point, and C indicates a light velocity.

Further, $t_{id}$ is determined by the first access point according to the signal transmission time $\Delta_1$ from the terminal to the first access point and the signal transmission time $\Delta_{i2}$ from the terminal to the $i^{th}$ second access point by determining $\Delta_1$ and $\Delta_{i2}$ according to $t_1$, $t_{i2}$, $t_{i3}$, $t_{i4}$, $t_{i5}$, and $$\Delta_1 = t_1 - t_0, \Delta_{i2} = (t_{i4} - t_0) - (t_{i3} - t_{i2}) - \Delta_{i3}, \Delta_{i3} = \frac{(t_{i6} - t_{i3}) - (t_{i5} - t_{i4})}{2},$$

$t_0$ indicates a moment at which the terminal sends the first positioning signal, and $\Delta_{i3}$ indicates a signal transmission time from the $i^{th}$ second access point to the first access point, and $$t_{id} = \Delta_{i2} - \Delta_1 = (t_{i4} - t_1) - (t_{i3} - t_{i2}) - \frac{(t_{i6} - t_{i3}) - (t_{i5} - t_{i4})}{2}.$$

Correspondingly, the location coordinates (x,y) of the terminal is determined by the first access point according to an equation $\sqrt{(x_i-x)^2-(y_i-y)^2}-\sqrt{(x_0-x)^2-(y_0-y)^2}=D_{i0}$ determined according to $D_{i0}$, the location coordinates $(x_0,y_0)$ of the first access point, and the location coordinates $(x_i,y_i)$ of the $i^{th}$ second access point.

Further, before the terminal sends the first positioning signal to the first access point and the n second access points, the method further includes:

sending, by the terminal, an exploration signal to the access points; determining, by the terminal, an access point sending an earliest-received response of the exploration signal as the first access point; and determining, by the terminal, access points as the n second access points, where times required for receiving responses of the exploration signal from the access points are in a preset range.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A first access point comprising:
   a receiver configured to:
     receive a first positioning signal from a terminal at a first moment $t_1$;
     record $t_1$;
     receive, at a fourth moment $t_4$, a second positioning signal from a second access point; and
     record $t_4$;
   a transmitter configured to:
     transmit, in response to receiving the second positioning signal, a response signal to the second access point at a fifth moment $t_5$, and
     record $t_5$, wherein the receiver is further configured to receive a second moment $t_2$ indicating when the second access point receives the first positioning signal, a third moment $t_3$ indicating when the second access point transmits the second positioning signal to the first access point, and a sixth moment $t_6$ indicating when the second access point receives the response signal; and
   a processor coupled to the receiver and the transmitter and configured to:
     determine a time difference $t_d$ according to $t_1$, $t_2$, $t_3$, $t_4$, $t_5$, and $t_6$, wherein $t_d$ indicates a first difference value between a first signal transmission time $\Delta_1$ from the terminal to the first access point and a second signal transmission time $\Delta_2$ from the terminal to the second access point;
     determine a distance difference $D_0$ according to $t_d$, wherein $D_0=C \times t_d$, $D_0$ indicates a second difference value between a first distance from the terminal to the first access point and a second distance from the terminal to the second access point, and C indicates a velocity of light; and
     determine first location (x,y) of the terminal according to the distance difference $D_0$, second location coordinates $(x_1, y_1)$ of the first access point, and third location coordinates $(x_2, y_2)$ of the second access point.

2. The first access point of claim 1, wherein the processor is further configured to:
determine $\Delta_1$ and $\Delta_2$ according to $t_1$, $t_2$, $t_3$, $t_4$, $t_5$, and $t_6$, wherein $$\Delta_1 = t_1 - t_0, \Delta_2 = (t_4 - t_0) - (t_3 - t_2) - \Delta_3,$$

$$\Delta_3 = \frac{(t_6 - t_3) - (t_5 - t_4)}{2},$$

$t_0$ indicates a moment at which the terminal sends the first positioning signal, and $\Delta_3$ indicates a third signal transmission time from the second access point to the first access point;
determine $t_d$ according to $\Delta_1$ and $\Delta_2$, wherein $$t_d = \Delta_2 - \Delta_1 = (t_4 - t_1) - (t_3 - t_2) - \frac{(t_6 - t_3) - (t_5 - t_4)}{2};$$

and
determine (x,y) according to the equation $$\sqrt{(x_2 - x)^2 - (y_2 - y)^2} - \sqrt{(x_1 - x)^2 - (y_1 - y)^2} = D_0.$$

3. A terminal comprising:
a transmitter configured to transmit a first positioning signal to a first access point and to a second access point;
a receiver configured to:
receive, from the first access point, a first moment $t_1$ indicating when the first access point receives the first positioning signal, a fourth moment $t_4$ indicating when the first access point receives a second positioning signal from the second access point, and a fifth moment $t_5$ indicating when the first access point transmits to the second access point a response signal of the second positioning signal; and
receive, from the second access point, a second moment $t_2$ indicating when the second access point receives the first positioning signal, a third moment $t_3$ indicating when the second access point transmits the second positioning signal to the first access point, and a sixth moment $t_6$ indicating when the second access point receives the response signal; and
a processor coupled to the transmitter and the receiver and configured to:
determine a time difference $t_d$ according to $t_1$, $t_2$, $t_3$, $t_4$, $t_5$, and $t_6$, wherein $t_d$ indicates a first difference value between a first signal transmission time $\Delta_1$ from the terminal to the first access point and a second signal transmission time $\Delta_2$ from the terminal to the second access point;
determine a distance difference $D_0$ according to $t_d$, wherein $D_0 = C \times t_d$, $D_0$ indicates a second difference value between a first distance from the terminal to the first access point and a second distance from the terminal to the second access point, and C indicates a velocity of light; and determine first location coordinates (x,y) of the terminal according to the distance difference $D_0$, second location coordinates $(x_1, y_1)$ of the first access point, and third location coordinates $(x_2, y_2)$ of the second access point.

4. The terminal of claim 3, wherein the processor is further configured to:
determine $\Delta_1$ and $\Delta_2$ according to $t_1$, $t_2$, $t_3$, $t_4$, $t_5$, and $t_6$, wherein $$\Delta_1 = t_1 - t_0, \Delta_2 = (t_4 - t_0) - (t_3 - t_2) - \Delta_3,$$

$$\Delta_3 = \frac{(t_6 - t_3) - (t_5 - t_4)}{2},$$

$t_0$ indicates a moment at which the terminal sends the first positioning signal, and $\Delta_3$ indicates a third signal transmission time from the second access point to the first access point;
determine $t_d$ according to $\Delta_1$ and $\Delta_2$, wherein $$t_d = \Delta_2 - \Delta_1 = (t_4 - t_1) - (t_3 - t_2) - \frac{(t_6 - t_3) - (t_5 - t_4)}{2};$$

and
determine (x,y) according to the equation $$\sqrt{(x_2 - x)^2 - (y_2 - y)^2} - \sqrt{(x_1 - x)^2 - (y_1 - y)^2} = D_0.$$

5. The terminal of claim 3, wherein, before transmitting the first positioning signal, the transmitter is further configured to transmit to the first access point and the second access points an exploration signal.

6. The terminal of claim 5, wherein the receiver is further configured to receive responses from the first access point and the second access point, at preset times, and in response to the exploration signal, and wherein the responses comprise an earliest-received response and additional responses.

7. The terminal of claim 6, wherein the processor is further configured to determine that the first access point sent the earliest-received response.

8. A wireless fidelity (WiFi) indoor positioning method implemented by a first access point, the method comprising:
receiving a first positioning signal from a terminal at a first moment $t_1$;
recording $t_1$;
receiving, at a fourth moment $t_4$, a second positioning signal from a second access point according to the first positioning signal;
recording $t_4$;
transmitting a response signal of the second positioning signal to the second access point at a fifth moment $t_5$;
recording $t_5$;
receiving a second moment $t_2$ indicating when the second access point receives the first positioning signal, a third moment $t_3$ indicating when the second access point transmits the second positioning signal to the first access point, and a sixth moment $t_6$ indicating when the second access point receives the response signal;

determining a time difference $t_d$ according to $t_1$, $t_2$, $t_3$, $t_4$, $t_5$, and $t_6$, wherein $t_d$ indicates a first difference value between a first signal transmission time $\Delta_1$ from the terminal to the first access point and a second signal transmission time $\Delta_2$ from the terminal to the second access point;

determining a distance difference $D_0$ according to $t_d$, wherein $D_0 = C \times t_d$, $D_0$ indicates a second difference value between a first distance from the terminal to the first access point and a second distance from the terminal to the second access point, and C indicates a velocity of light;

and determining first location coordinates (x,y) of the terminal according to $D_0$, second location coordinates $(x_1, y_1)$ of the first access point and third location coordinates $(x_2, y_2)$ of the second access point.

9. The method of claim 8, wherein the determining the time difference $t_d$ comprises:

determining $\Delta_1$ and $\Delta_2$ according to $t_1$, $t_2$, $t_3$, $t_4$, $t_5$, and $t_6$, wherein $$\Delta_1 = t_1 - t_0, \Delta_2 = (t_4 - t_0) - (t_3 - t_2) - \Delta_3,$$

$$\Delta_3 = \frac{(t_6 - t_3) - (t_5 - t_4)}{2},$$

$t_0$ indicates a moment at which the terminal sends the first positioning signal, and $\Delta_3$ indicates a third signal transmission time from the $i^{th}$ second access point to the first access point; and determining $t_d$ according to $\Delta_1$ and $\Delta_2$, wherein $$t_d = \Delta_2 - \Delta_1 = (t_4 - t_1) - (t_3 - t_2) - \frac{(t_6 - t_3) - (t_5 - t_4)}{2}.$$

10. The method of claim 9, wherein the first location coordinates (x,y) are determined according to the equation $$\sqrt{(x_2 - x)^2 - (y_2 - y)^2} - \sqrt{(x_1 - x)^2 - (y_1 - y)^2} = D_0.$$

* * * * *

UNITED STATES PATENT AND TRADEMARK OFFICE
CERTIFICATE OF CORRECTION

PATENT NO.           : 9,952,308 B2
APPLICATION NO.      : 15/410881
DATED                : April 24, 2018
INVENTOR(S)          : Hongkun He et al.

It is certified that error appears in the above-identified patent and that said Letters Patent is hereby corrected as shown below:

In the Claims

Column 24; Line 64; Claim 1 should read:
determine first location coordinates (x,y) of the terminal according to Signed and Sealed this
Fifth Day of June, 2018

Andrei Iancu
*Director of the United States Patent and Trademark Office*